July 6, 1954 C. T. FORBES ET AL 2,683,105
METHOD OF PRODUCING PLASTIC LAMINATES
Filed Aug. 25, 1952
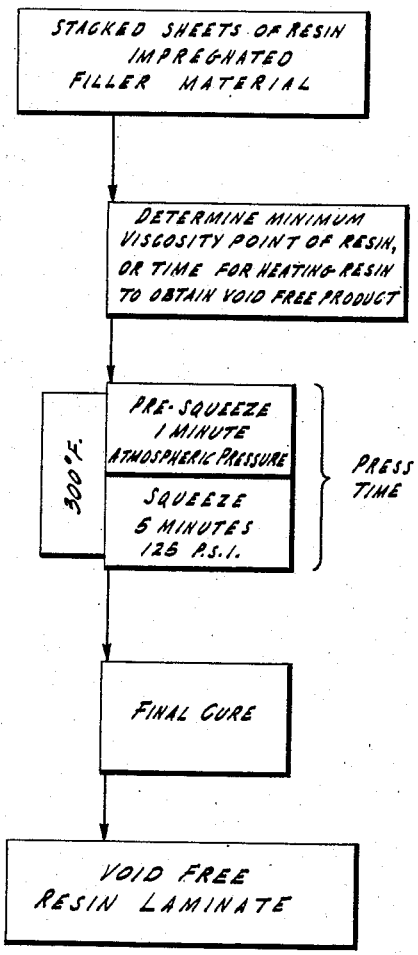
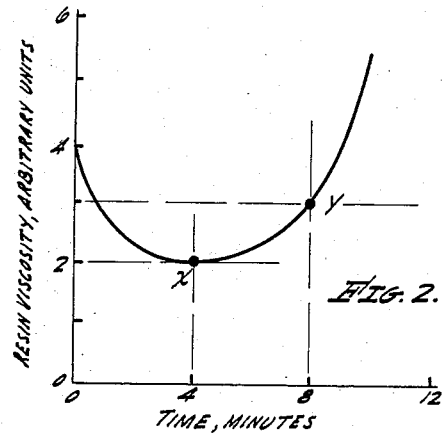
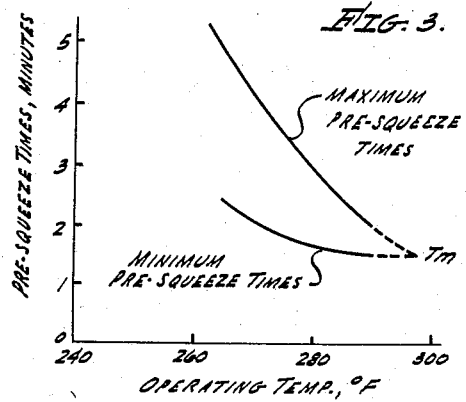
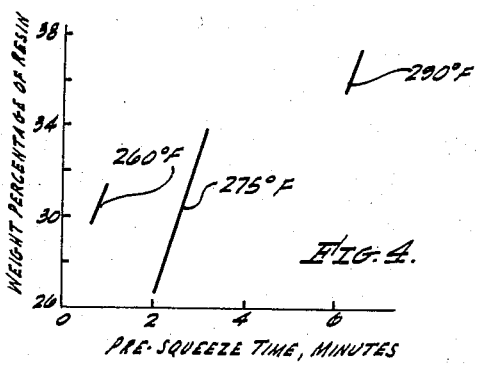
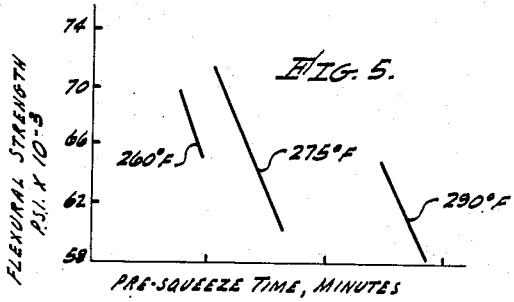
INVENTOR.
CHARLES T. FORBES,
BY DONALD M. HATCH, JR.,
ATTORNEY.

Patented July 6, 1954

2,683,105

UNITED STATES PATENT OFFICE 2,683,105

METHOD OF PRODUCING PLASTIC LAMINATES

Charles T. Forbes, Playa Del Ray, and Donald M. Hatch, Jr., Lomita, Calif., assignors, by mesne assignments, to Hughes Aircraft Company, a corporation of Delaware Application August 25, 1952, Serial No. 306,195

8 Claims. (Cl. 154—140)

This invention relates to processes for producing plastic products, and more particularly to a method of producing void-free plastic laminates, such as phenolic laminates and the like.

In the production of phenolic laminates, for instance, a common practice has been to subject stacked sheets or laminae of phenolic resin impregnated filler material, such as phenolic resin impregnated glass cloth and the like, to considerable pressures for a relatively long period of time in suitable presses. Although quantity production of phenolic laminates is attained in this manner, production is nevertheless limited, and cost of production is kept relatively high because the laminae must remain in the presses for an appreciable length of time. Accordingly, production is limited by the number of presses available. The laminates obtained in this manner contain voids throughout, and this limits the flexural strength of the material; furthermore, additional extensive treatment of the surfaces of such laminates is required where it is desired to render them impervious to gases and moisture.

The present invention provides a method of producing phenolic laminates which eliminates many of the disadvantages of prior art methods. In accordance with the disclosed invention, stacked sheets or layers of filler materials impregnated with a thermosetting resin, such as phenolic resin, are subjected to pressures and temperatures which are rigorously controlled. Substantially void-free laminates are thus obtained which require much less press time than has heretofore been necessary.

In accordance with the present invention, time limits are determined for heating a stack of a plurality of sheets of phenolic resin impregnated filler material at a predetermined temperature, under substantially atmospheric pressure, until volatile matter within the phenolic resin escapes. After heating until the volatile matter has been driven off from the phenolic resin, laminating pressure is applied to the stack while a predetermined degree of cure of the phenolic resin is effected, that is, the stack is subjected to a high-pressure or squeeze period, at the same temperature, during which the resin is cured to a desired intermediate extent. Final curing of the resin may then be achieved by post-curing the resin, as, for example, by heating the stack in an oven for a prolonged period, for instance, at 275 degrees Fahrenheit (° F.) for 17 hours. The product thus obtained is substantially void-free and exhibits a flexural strength heretofore unattainable with phenolic resin impregnated laminates. The total press time required to achieve improved phenolic laminates prior to post-curing is relatively short compared to prior art methods, because longer oven cure supplants the conventional press cure. Since press time required is much less, this process is considerably less expensive than that required where relatively longer press times are employed; furthermore, with the same equipment, greater production can be realized with the present process than has heretofore been possible.

It is, therefore, an object of this invention to provide a method of producing substantially void-free plastic laminates.

It is another object of this invention to provide a method of producing phenolic laminates by rigorous control of heat and pressure.

It is still another object of this invention to provide a method of producing substantially void-free phenolic laminates which requires relatively short press times.

It is a further object of this invention to provide a relatively inexpensive method for the rapid production of substantially void-free phenolic laminates having high flexural strength.

The novel features which are believed to be characteristic of the invention, both as to its organization and method of operation, together with further objects and advantages thereof, will be better understood from the following description considered in connection with the accompanying drawings. It is to be expressly understood, however, that the drawings and examples are for the purpose of illustration and description only, and are not intended as a definition of the limits of the invention.

Fig. 1 is a flow diagram illustrating the steps of a process for producing void-free phenolic laminates in accordance with this invention; and Figs. 2–5 are charts showing certain characteristics of phenolic laminates produced by the method illustrated in Fig. 1.

Fig. 1 illustrates one example of the application of the present method of producing a substantailly void-free laminate from stacked sheets or laminae of filler material, such as glass cloth and the like, that are impregnated with a thermo-setting resin, which may, for example, be a phenolic resin. Initially, a determination is made of (1) the time for heating the laminae, at a predetermined temperature and under substantially atmospheric pressure, to permit substantially all volatile matter within the resin of the laminae to escape, and (2) the time of application of pressure to the laminae, at the same temperature, after the release of such volatile matter. The basis for this determination will be explained hereinafter in connection with Figs. 2 and 3. The total time for heating the laminae in accordance with the aforementioned determination is more conveniently referred to as press time. The press time consists of a "pre-squeeze" period, wherein the lay-up is heated at the selected tempearture for the time determined, and at substantially atmospheric pressure, to permit volatile matter within the resin to escape, and a "squeeze" period, wherein a predetermined laminating pressure is applied to the laminae, at the same temperature employed during the pre-squeeze period, for shaping the laminae as desired, while the resin cures to a desired intermediate extent prior to final curing. The extent of cure during the squeeze period is determined by the duration of the squeeze period; the extent of cure required is governed by the amount of handling that is necessary prior to final cure, for example, machining operations and the like.

The final treatment for the pressed laminae is a suitable post-cure treatment to effect the desired extent of final cure of the resin. Such post-cure may be effected by heating the laminae at a selected temperature for a sufficient time to effect the desired extent of final cure, or by heat-curing the pressed laminae in a silicone oil bath in the manner taught in an application entitled, Method of Producing Plastic Products, by C. T. Forbes, Serial No. 306,194 filed concurrently with the present application, and assigned to the same assignee as this application.

In the present example, the laminae comprised six sheets of phenolic resin impregnated glass cloth having a total thickness of 0.055 to 0.060 inch. A pre-squeeze time of one minute, at a temperature of 300° F. and a pressure of 2 pounds per square inch (p. s. i.), was sufficient to heat the phenolic resin to a liquid phase and permit the volatile matter therein to escape. At the same temperature, a squeeze time of five minutes, during which a pressure of 125 p. s. i. was applied to the lay-up, effected the cure necessary for handling or machining.

The solidified and cured plastic product is a laminate that is substantially void-free, that is, it is substantially impervious to gases. In addition, the flexural strength of a laminate produced in accordance with this invention is markedly greater than the flexural strength exhibited by laminates of an equivalent composition produced by prior art methods. For example, a six-ply phenolic resin laminate, processed as above described, will exhibit a flexural strength in the neighborhood of 76,000 p. s. i., which may be up to 30% higher than that exhibited by prior art phenolic resin laminates.

Factors to be considered in determining the conditions for producing void-free laminates are:

(a) The rate of decrease of resin viscosity due to increasing temperature;

(b) The rate of increase of resin viscosity due to cure of the thermo-setting resin as the heating proceeds, and (c) The rate of release of volatile matter from the resin.

Fig. 2 shows a curve that illustrates the variation in viscosity for a typical thermo-setting resin as it undergoes heat and cure over a period of time. The viscosity of such a resin decreases with time, while being heated at a particular or selected temperature, to a minimum viscosity point, shown at X on the curve of Fig. 2, and then increases. At some time after the minimum resin viscosity point, X, has been reached, the viscosity of the resin approaches a gelation point, Y, which is the point at which solidification of the resin begins. For a given operating temperature, the time interval between the points X and Y defines the range of time during which laminating pressure should be applied to laminae that are impregnated with the resin for the purpose aforementioned, that is, the end of the pre-squeeze period. When the minimum viscosity point has been reached, the resin is in the liquid phase and substantially all the volatile matter within the resin has escaped therefrom. Following the release of the volatile matter, and the application of pressure to the laminae at the same operating or selected temperature, further curing of the resin results in a void-free laminate, that is, one that is substantially impervious to gases.

For any thermo-setting resin impregnated laminae, the time for heating the laminae at a particular temperature to the minimum viscosity point of the resin represents the minimum pre-squeeze period for which a void-free laminate can be obtained. The gelation point corresponds to the end of the maximum permissible pre-squeeze period for obtaining such a void-free laminate. As will be explained more clearly in connection with Fig. 3, laminating pressure applied to the laminae beyond the maximum permissible pre-squeeze time will effect rupture of the material.

The previous history of the resin, as represented by the degree of advancement of the resin which exists at the time the heating of the lamine is started, largely determines the particular temperature at which the laminae must be heated, and also the permissible pre-squeeze period. Thus, it is necessary either that the minimum viscosity and gelation points of the particular resin be determined for a selected temperature, as by conventional procedures for determining such characteristics directly, or, where stacked sheets or laminae of filler material impregnated with the resin are to be treated as outlined above in connection with Fig. 1, samples of the stacked sheets may be tested for determining the minimum and maximum pre-squeeze times. Such tests may be effected by heating the sample stacks at a predetermined temperature for respective periods of time, that is, selected pre-squeeze periods, subjecting each of the samples to a suitable squeeze period, post-curing each sample, and finally testing each sample to determine the relative freedom from voids exhibited thereby. Any suitable test for determining the amount of voids may be utilized. Once a substantially void-free sample is obtained, further tests with other samples can be performed to determine, respectively, the permissible minimum and maximum pre-squeeze period.

Fig. 3 is a chart illustrating, for laminae impregnated with one phenolic resin, respective curves of minimum and maximum pre-squeeze times versus different operating temperatures. The minimum pre-squeeze time is that time required for heating the laminae, at a selected temperature and under substantially atmospheric pressure, to permit the escape of substantially all volatile matter from the resin. The application of pressure to the laminae at the same temperature must occur before the maximum permissible pre-squeeze time has passed, because the resin is semi-solid after the maximum pre-squeeze time has elapsed; the laminate will tend to fracture upon application of pressure at a time past the maximum permissible pre-squeeze time.

It will be observed from Fig. 3 that the time interval between the points of minimum and maximum pre-squeeze times decreases as the operating temperature increases, and both points are reached within shorter time intervals at higher temperatures. This means that a point is reached at a temperature, $T_m$, above which the release of volatile matter will not occur with sufficient completeness to permit a void-free laminate to be obtained. For many phenolic laminates, this point has been found to be at a temperature in the neighborhood of 300° F. For the example illustrated in Fig. 3, it is noted that the curves are plotted for temperatures between 260° F. and 300° F.; however, for different phenolic laminating materials in which the resin properties vary, well-defined curves can be obtained to temperatures as low as 225° F.

The pre-squeeze times plotted in Fig. 3 are illustrative of only one example of phenolic resin laminating material. For phenolic resins having different inherent properties, for example, for phenolic resins of different degrees of advancement, the permissible pre-squeeze times and the temperature range for obtaining void-free products will vary or shift. The same will be true for any other thermo-setting resin. The pre-squeeze period must extend at least to the point of minimum pre-squeeze time for the particular temperature at which the resin laminae are heated, that is, the squeeze period must not begin prior to such point, and the pre-squeeze period may be maintained as long as desired up to the point of maximum pre-squeeze time; this will depend upon the inherent properties of the resin and the fundamental rate at which the reaction of the resin during curing takes place.

For different permissible combinations of operating temperature and pre-squeeze time, the resin content of a given resulting laminate will vary within predetermined limits. Fig. 4 shows a plot of the weight, in percent, of resin in a typical void-free phenolic laminate for different pre-squeeze times at three operating temperatures. At each operating temperature, it is noted that the weight percent of resin increases as the pre-squeeze time increases.

It is well known that the flexural strength of a phenolic laminate varies with the resin content. Therefore, since the resin content also varies with the pre-squeeze time, as described in connection with Fig. 4, the flexural strength will also vary with the pre-squeeze time. Fig. 5 illustrates plots of flexural strength for a phenolic laminate for the combinations of pre-squeeze time and temperature of Fig. 4. It should be observed that the flexural strength decreases as the pre-squeeze time progresses. Thus, for a given temperature, the resin content for a laminate undergoing a pre-squeeze period that extends into the void-free range, i. e., between the points of minimum and maximum pre-squeeze time, has a bearing on the point at which the pre-squeeze time should be terminated in order to obtain a void-free laminate having the highest possible flexural strength. For phenolic laminates having different resin contents, the pre-squeeze period may extend up to ten minutes for operating temperatures within the range from approximately 225° F. to approximately 300° F., in order to obtain void-free phenolic laminates having high flexural strength.

As indicated heretofore, the rigorous control of conditions of temperature and time of application of pressure to phenolic laminates in the manner outlined above will result in a void-free laminate having a flexural strength that far exceeds that exhibited by phenolic laminates produced by prior art methods. Furthermore, the pressures required during the squeeze periods for phenolic laminates that have undergone pre-squeeze periods as taught herein are generally lower than pressures employed to produce such laminates by prior art methods. Accordingly, the present invention provides a method for producing phenolic laminates which are of better quality than those of the prior art, and the present method is relatively inexpensive by comparison with prior art methods. Moreover, the total press time for the laminate is considerably reduced due to the fact that the ultimate cure may be completed by merely heating the laminate, as in an ordinary oven, as long as necessary to achieve the desired cure; this means that, for a given amount of press equipment, the shorter press time permits the production of greater quantities of such laminates.

What is claimed as new is:

1. The method of processing filler material that is impregnated with a thermo-setting resin so as to obtain a void-free product, said method comprising the steps of heating said material under substantially atmospheric pressure to a point intermediate the minimum viscosity and gelation points of the resin, subjecting said material to an elevated pressure at said intermediate point during continued heating to partially cure the resin, and further heating said material under substantially atmospheric pressure to achieve a final cure of the resin.

2. The method of producing void-free laminates from a lay-up of a plurality of sheets of filler material impregnated with a thermo-setting resin, wherein, for a selected temperature, there is a minimum time for heating said lay-up at said temperature to obtain the release of substantially all volatile matter within said resin, said method comprising the steps of heating said lay-up at said temperature for at least said minimum time and at substantially atmospheric pressure, applying pressure to said lay-up at said temperature to achieve partial cure of said resin, and heating said lay-up under substantially atmospheric pressure to achieve final cure of said resin.

3. The method of producing void-free phenolic laminates from a plurality of stacked sheets of phenolic resin impregnated filler material, said method comprising the steps of heating said stack under substantially atmospheric pressure to bring the resin therein to a liquid state and at least to the minimum viscosity point thereof, applying pressure greater than atmospheric pressure to said stack at a point beyond said minimum viscosity point during continued heating of said stack, and heating said stack under atmospheric pressure for post-curing the resin.

4. The method defined in claim 3 in which the heating of said stack to said minimum viscosity point is at a temperature within the range from 225° F. to 300° F.

5. The method of producing void-free phenolic laminates from a stack of sheets of filler material impregnated with phenolic resin, said method comprising the steps of heating said stack under substantially atmospheric pressure at a temperature within the range from approximately 225° F. to approximately 300° F., increasing the pressure on said stack at a point intermediate the minimum viscosity and gelation points of the resin to effect partial cure of the resin, and heating said pressed stack at a constant temperature under substantially atmospheric pressure to effect a final cure of the resin.

6. The method of producing void-free laminates from a stack of sheets of filler material impregnated with phenolic resin in which said resin, when heated to a selected temperature for a period of time, reaches, first, a minimum viscosity point, and thereafter a point of gelation, said method comprising the steps of heating said stack, at a temperature within the range from approximately 225° F. to approximately 300° F. and under substantially atmospheric pressure, to a point intermediate said minimum viscosity point and said gelation point, applying not more than 400 pounds per square inch of pressure at said temperature to said stack to partially cure said resin, and heating said stack under substantially atmospheric pressure to effect a final cure of said resin.

7. The method of producing a void-free phenolic laminate from a stack of a plurality of sheets of glass cloth that are impregnated with phenolic resin, said method comprising heating said stack at 300° F. under an initial pressure not greater than two pounds per square inch, maintaining said initial pressure at said temperature for one minute, thereafter applying an increased pressure of 125 pounds per square inch to said stack, said temperature maintaing said increased pressure on said stack for five minutes, and baking the pressed stack at 275° F. under substantially atmospheric pressure to attain a final cure for the resin.

8. The method of processing filler material that is impregnated with a thermo-setting resin which, during sustained heating, successively passes through a point of minimum viscosity and a point of gelation, said method comprising the steps of heating said material under substantially atmospheric pressure and at a constant temperature to a point of viscosity of the resin that is intermediate the minimum viscosity and gelation points to liberate volatile matter from the resin, applying pressure to said material at said intermediate point, and at said temperature, to partially cure the resin, and heating said partially cured material under substantially atmospheric pressure to obtain a final cure of the resin.

References Cited in the file of this patent

UNITED STATES PATENTS

| Number | Name | Date |
|--------|------|------|
| 2,398,388 | Norton | Apr. 16, 1946 |
| 2,486,201 | Patterson | Oct. 25, 1949 |
| 2,613,167 | Cone | Oct. 7, 1952 |